US011983815B2

(12) United States Patent
Shen et al.

(10) Patent No.: US 11,983,815 B2
(45) Date of Patent: May 14, 2024

(54) SYNTHESIZING HIGH RESOLUTION 3D SHAPES FROM LOWER RESOLUTION REPRESENTATIONS FOR SYNTHETIC DATA GENERATION SYSTEMS AND APPLICATIONS

(71) Applicant: NVIDIA Corporation, Santa Clara, CA (US)

(72) Inventors: Tianchang Shen, Markham (CA); Jun Gao, Toronto (CA); Kangxue Yin, Toronto (CA); Ming-Yu Liu, San Jose, CA (US); Sanja Fidler, Toronto (CA)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/718,172

(22) Filed: Apr. 11, 2022

(65) Prior Publication Data
US 2022/0392162 A1    Dec. 8, 2022

Related U.S. Application Data

(60) Provisional application No. 63/194,693, filed on May 28, 2021.

(51) Int. Cl.
*G06T 17/20*    (2006.01)
*G06T 7/50*     (2017.01)

(52) U.S. Cl.
CPC ............... *G06T 17/20* (2013.01); *G06T 7/50* (2017.01); *G06T 2207/10028* (2013.01); *G06T 2207/20081* (2013.01); *G06T 2207/20084* (2013.01)

(58) Field of Classification Search
CPC .. G06T 17/20; G06T 7/50; G06T 2207/10028
See application file for complete search history.

(56) References Cited

U.S. PATENT DOCUMENTS

2009/0244065 A1    10/2009   Storti et al.
2016/0364907 A1*   12/2016   Schoenberg ......... G02B 27/017
(Continued)

FOREIGN PATENT DOCUMENTS

WO    2022250796 A1    12/2022

OTHER PUBLICATIONS

Wang, W., et al., "DISN: Deep Implicit Surface Network for High-quality Single-view 3D Reconstruction", Conference on Neural Information Processing Systems, pp. 1-11 (2019).
(Continued)

*Primary Examiner* — Matthew Salvucci
(74) *Attorney, Agent, or Firm* — Taylor English Duma L.L.P.

(57) ABSTRACT

In various examples, a deep three-dimensional (3D) conditional generative model is implemented that can synthesize high resolution 3D shapes using simple guides—such as coarse voxels, point clouds, etc.—by marrying implicit and explicit 3D representations into a hybrid 3D representation. The present approach may directly optimize for the reconstructed surface, allowing for the synthesis of finer geometric details with fewer artifacts. The systems and methods described herein may use a deformable tetrahedral grid that encodes a discretized signed distance function (SDF) and a differentiable marching tetrahedra layer that converts the implicit SDF representation to an explicit surface mesh representation. This combination allows joint optimization of the surface geometry and topology as well as generation of the hierarchy of subdivisions using reconstruction and adversarial losses defined explicitly on the surface mesh.

21 Claims, 8 Drawing Sheets

(56) References Cited

U.S. PATENT DOCUMENTS

| | | | | |
|---|---|---|---|---|
| 2020/0387739 | A1* | 12/2020 | Williams | ............... G06T 5/005 |
| 2021/0149022 | A1 | 5/2021 | Kehl et al. | |
| 2021/0272345 | A1* | 9/2021 | Lesser | ..................... G06T 13/60 |
| 2022/0392162 | A1 | 12/2022 | Shen et al. | |

OTHER PUBLICATIONS

Wang, P-S., et al., "Deep octree-based CNNs with output-guided skip connections for 3D shape and scene completion", In Proceedings of the IEEE/CVF Conference on Computer Vision and Pattern Recognition Workshops, pp. 1-8 (2020).

Williams, F., et al., "Neural splines: Fitting 3D surfaces with infinitely-wide neural networks", arXiv:2006.13782v2, pp. 1-24 (2020).

Yin, K., et al., "COALESCE: Component Assembly by Learning to Synthesize Connections", arXiv:2008.01936v2, pp. 1-20 (2020).

Zhu, C., et al., "SCORES: Shape Composition with Recursive Substructure Priors", ACM Transactions on Graphics, vol. 37, No. 6, pp. 1-14 (Nov. 2018).

Brock, A., et al., "Generative and Discriminative Voxel Modeling with Convolutional Neural Networks", arXiv:1608.04236v2, pp. 1-9 (Aug. 16, 2016).

Chen, D-Y., et al., "On Visual Similarity Based 3D Model Retrieval", Eurographics, vol. 22, No. 3, pp. 223-232 (2003).

Chang, A. X., et al., "ShapeNet: An Information-Rich 3D Model Repository", arXiv:1512.03012v1, pp. 1-11 (Dec. 9, 2015).

Choy, C. B., et al., "3D-R2N2: A Unified Approach for Single and Multi-view 3D Object Reconstruction", European conference on computer vision, pp. 628-644 (2016).

Chen, W., et al., "Learning to Predict 3D Objects with an Interpolation-based Differentiable Renderer", Conference on Neural Information Processing Systems, pp. 1-11 (2019).

Chen, Z., et al., "BSP-Net: Generating Compact Meshes via Binary Space Partitioning", arXiv:1911.06971v1, pp. 1-10 (2019).

Chen, Z., and Zhang, H., "Learning Implicit Fields for Generative Shape Modeling", Conference on Computer Vision and Pattern Recognition, IEEE, pp. 5939-5948 (2019).

Chen, Z., et al., "DECOR-GAN: 3D Shape Detailization by Conditional Refinement", Conference on Computer Vision and Pattern Recognition, IEEE, pp. 15740-15749 (2021).

Doi, A., and Koide, A., "An Efficient Method of Triangulating Equi-Valued Surfaces by Using Tetrahedral Cells", IEICE Transactions, vol. E74, No. 1, pp. 214-224 (Jan. 1991).

Doran, C., et al., "Isosurface Stuffing Improved: Acute Lattices and Feature Matching", ACM SIGGRAPH, p. 1 (Jul. 2013).

Dai, A., et al., "Shape Completion using 3D-Encoder-Predictor CNNs and Shape Synthesis", Conference on Computer Vision and Pattern Recognition, IEEE, pp. 5868-5877 (2017).

Dai, A., et al., "ScanComplete: Large-Scale Scene Completion and Semantic Segmentation for 3D Scans", Conference on Computer Vision and Pattern Recognition, IEEE, pp. 4578-4587 (2018).

Duan, Y., et al., "Curriculum DeepSDF", In European Conference on Computer Vision, arXiv:2003.08593v1, pp. 1-17 (Mar. 19, 2020).

Davies, T., et al., "Overfit Neural Networks as a Compact Shape Representation", arXiv:2009.09808v1, pp. 1-9 (Sep. 17, 2020).

Deng, Y., et al., "Deformed Implicit Field: Modeling 3D Shapes with Learned Dense Correspondence", arXiv:2011.13650v1, pp. 1-15 (Nov. 27, 2020).

Groueix, T., et al., "A Papier-Mache Approach to Learning 3D Surface Generation", In Proceedings of the IEEE Conference on Computer Vision and Pattern Recognition, pp. 216-224 (2018).

Gkioxari, G., et al., "Mesh R-CNN", In Proceedings of the IEEE International Conference on Computer Vision, pp. 9785-9795 (2019).

Gao, L., et al., "SDM-NET: Deep Generative Network for Structured Deformable Mesh", ACM Transactions on Graphics, vol. 38, No. 6, Article 243, p. 243:1-243:15 (Nov. 2019).

Gao, J., et al., "Learning Deformable Tetrahedral Meshes for 3D Reconstruction", Conference on Neural Information Processing Systems, pp. 1-12 (Nov. 3, 2020).

Hane, C., et al., "Hierarchical Surface Prediction for 3D Object Reconstruction", In International Conference on 3D Vision, IEEE, pp. 1-12 (2017).

Hanocka, R., et al., "Point2Mesh: A Self-Prior for Deformable Meshes", ACM Trans. Graph, vol. 39, No. 4, Article 126, pp. 126:1-126:12 (2020).

Hao, Z., "DualSDF: Semantic shape manipulation using a two-level representation", IEEE, pp. 7631-7641 (2020).

Kleineberg, M., et al., "Adversarial Generation of Continuous Implicit Shape Representations", arXiv:2002.00349v2, pp. 1-6 (2020).

Loop, C. T., "Smooth subdivision surfaces based on triangles", University of Utah, pp. 1-74 (1987).

Lorensen, W. E., and Cline, H. E., "Marching Cubes: A High Resolution 3D Surface Construction Algorithm", ACM SIGGRAPH Computer Graphics, pp. 163-169 (1987).

Liao, Y., et al., "Deep Marching Cubes: Learning Explicit Surface Representations", Proceedings of the IEEE Conference on Computer Vision and Pattern Recognition (CVPR), pp. 2916-2925 (2018).

Liu, Z., et al., "Point-Voxel CNN for Efficient 3D Deep Learning", Conference on Neural Information Processing Systems, pp. 1-11 (2019).

Li, M., and Zhang, H., "D2IM-Net: Learning Detail Disentangled Implicit Fields from Single Images", arXiv:2012.06650v2, pp. 1-6 (2020).

Maturana, D., and Scherer, S., "VoxNet: A 3D Convolutional Neural Network for Real-Time Object Recognition", International Conference on Intelligent Robots and Systems, pp. 922-928 (2015).

Mao, X., "Least Squares Generative Adversarial Networks", Proceedings of the IEEE International Conference on Computer Vision (ICCV), pp. 2794-2802 (2017).

Murthy, J. K., et al., "Kaolin: A pytorch library for accelerating 3D deep learning research", arXiv:1911.05063v2, pp. 1-7 (2019).

Mescheder, L., et al., "Occupancy Networks: Learning 3D Reconstruction in Function Space", Computer Vision and Pattern Recognition, pp. 4460-4470 (2019).

Mildenhall, B., et al., "NeRF: Representing Scenes as Neural Radiance Fields for View Synthesis", arXiv:2003.08934v2, pp. 1-25 (Aug. 3, 2020).

Nash, C., et al., "PolyGen: An Autoregressive Generative Model of 3D Meshes", International Conference on Machine Learning, pp. 1-10 (2020).

Park, J., J., et al., "DeepSDF: Learning Continuous Signed Distance Functions for Shape Representation", Conference on Computer Vision and Pattern Recognition, pp. 165-174 (2019).

Peng, S., et al., "Convolutional Occupancy Networks", arXiv:2003.04618v2, pp. 1-17 (Aug. 1, 2020).

Paschalidou, D., et al., "Neural Parts: Learning Expressive 3D Shape Abstractions with Invertible Neural Networks", Computer Vision and Pattern Recognition, IEEE, pp. 3204-3215 (2021).

Riegler, G., et al., "OctNet: Learning Deep 3D Representations at High Resolutions", Conference on Computer Vision and Pattern Recognition, IEEE, pp. 3577-3586 (2017).

Riegler, G., et al., "OctNetFusion: Learning Depth Fusion from Data", arXiv: 1704.01047v3, IEEE, pp. 1-10 (Oct. 31, 2017).

Remelli, E., et al., "MeshSDF: Differentiable Iso-Surface Extraction", Conference on Neural Information Processing Systems, pp. 1-11 (2020).

Sung, M., et al., "ComplementMe: Weakly-supervised component suggestions for 3D modeling", ACM Transactions on Graphics, vol. 36, No. 6, Article 226, pp. 1-12 (Nov. 2017).

Saito, S., et al., "Pifu: Pixel-aligned implicit function for high-resolution clothed human digitization", In Proceedings of theIEEE/CVF International Conference on Computer Vision, pp. 2304-2314 (2019).

Saito, S., et al., "PIFuHD: Multi-level pixel-aligned implicit function for high-resolution 3D human digitization", In Proceedings of the IEEE Conference on Computer Vision and Pattern Recognition, pp. 84-93 (2020).

(56) References Cited

OTHER PUBLICATIONS

Tatarchenko, M., et al., "Octree generating networks: Efficient convolutional architectures for high-resolution 3D outputs," In IEEE International Conference on Computer Vision (ICCV), pp. 2088-2096 (2017).

Tulsiani, S., et al., "Learning shape abstractions by assembling volumetric primitives", In Computer Vision and Pattern Regognition (CVPR), pp. 2635-2643 (2017).

Takikawa, T., et al., "Neural geometric level of detail: Real-time rendering with implicit 3D shapes", arXiv:2101.10994v1, pp. 1-16 (2021).

Wu, Z., et al., "3D ShapeNets: A Deep Representation for Volumetric Shapes", In Proceedings of the IEEE conference on computer vision and pattern recognition, pp. 1912-1920 (2015).

Wu, J., et al., "Learning a Probabilistic Latent Space of Object Shapes via 3D Generative-Adversarial Modeling", Conference on Neural Information Processing Systems, pp. 1-9 (2016).

Wang, P-S., et al., "O-CNN: Octree-based Convolutional Neural Networks for 3D Shape Analysis", ACM Transactions on Graphics (SIGGRAPH), vol. 36, Issue 4, Article 72, pp. 1-11 (2017).

Wang, N., et al., "Pixel2mesh: Generating 3D mesh models from single RGB images", In Proceedings of the European Conference on Computer Vision (ECCV), pp. 1-16 (2018).

International Search Report and Written Opinion for PCT Application No. PCT/US2022/024306, filed Apr. 11, 2022, dated Aug. 8, 2022, 14 pgs.

D'Otreppe, et al.; "Generating Smooth Surface Meshes From Multi-Region Medical Images", International Journal for Numerical Methods in Biomedical Engineering, vol. 28, No. 6-7, Oct. 17, 2011, pp. 642-660, 19 pgs.

Klacansky, et al.; "Fast and Exact Fiber Surfaces for Tetrahedral Meshes", IEEE Transaction on Visualization and Computer Graphics, IEEE, USA, vol. 23, No. 7, Jul. 1, 2017, pp. 1782-1795.

Liu, et al.; "Neural Subdivision" ACM Transaction on Graphics, ACM, NY, US, vol. 39, No. 4, Jul. 8, 2020, pp. 124: 1-124: 16pgs.

Remelli, et al.; "MeshSDF: Differentiable Iso-Surface Extraction" arxiv.org, Cornell University Library, 201 Olin Library Cornell University Ithaca, NY 14853, Oct. 31, 2020.

Shen, et al.; "Deep Marching Tetrahedra: a Hybrid Representation for High-Resolution 3D Shape Synthesis" arxiv.org, Cornell University Library, 201 Olin Library Cornell University Ithaca, NY 14853, Nov. 8, 2021.

Shen, Tianchang; International Preliminary Report on Patentability for PCT Application No. PCT/US2022/024306, filed Apr. 11, 2022, mailed Dec. 7, 2023, 10 pgs.

\* cited by examiner

SYNTHESIZING HIGH RESOLUTION 3D SHAPES FROM LOWER RESOLUTION REPRESENTATIONS FOR SYNTHETIC DATA GENERATION SYSTEMS AND APPLICATIONS

CROSS-REFERENCE TO RELATED APPLICATIONS

This application claims the benefit of U.S. Provisional Application No. 63/194,693, filed on May 28, 2021, which is hereby incorporated by reference in its entirety.

BACKGROUND

Fields such as simulation, architecture, gaming, and film rely on high quality three-dimensional (3D) content with rich geometric details and topology. However, creating high quality 3D shapes suitable for such applications requires a significant amount of development time, compute, and memory—often for each individual shape. In contrast, creating coarse 3D shapes—e.g., with voxels, blocks, sparse point clouds, etc.—is much less time, compute, and memory intensive, and has thus been widely adopted by all types of users, including those that may not have 3D modeling expertise.

A powerful 3D representation is a critical component of a learning-based 3D content creation framework. For example, a good 3D representation for high quality reconstruction and synthesis should be able to capture local geometric details and represent objects with arbitrary topology, while also being memory and computationally efficient for fast inference in interactive, near real-time, and/or real-time applications. To accomplish this, prior approaches have used neural implicit representations that use a neural network to represent a signed distance field (SDF) and/or an occupancy field (OF) of a shape. However, most existing implicit approaches are trained by regressing to the SDF or occupancy values and are not able to use explicit supervision on the underlying surface that would allow for useful constraints that are beneficial to training, leading to artifacts when synthesizing fine details. To mitigate this issue, some existing approaches use iso-surfacing techniques such as the Marching Cubes (MC) algorithm to extract a surface mesh from the implicit representation—a computationally expensive approach that depends heavily on the resolution of the grid used in the MC. Running iso-surfacing on a limited resolution introduces quantization errors in the geometry and typology of the surface. As a result, existing implicit approaches either use implicit representations that result in lower quality shape synthesis, or use a combination of implicit and explicit iso-surfacing techniques that are computationally expensive and reliant on grid resolution—thus making these approaches less suitable for high quality shape synthesis in interactive, near real-time, or real-time applications.

Some prior approaches include voxel-based approaches that represent 3D shapes as voxels which store the coarse occupancy (inside/outside) values on a regular grid. For high resolution shape synthesis, generative adversarial networks have been used to transfer geometric details from a high resolution voxel shape to a low resolution shape by using a discriminator defined on 3D patches of the voxel grid. However, the computational and memory cost grows cubically as the resolution increases, prohibiting reconstruction of fine geometric details and smooth curves.

Other prior approaches use surface-based methods that directly predict triangular meshes. Typically, surface-based methods assume that the topology of the shape is predefined, and can lose accuracy for objects with complex topological variations. Furthermore, similarly to voxel-based methods, the computational cost increases cubically with the grid resolution. In addition, meshes generated in prior approaches may contain typological errors such as non-manifold vertices and edges due to self-intersections of the mesh faces.

SUMMARY

Embodiments of the present disclosure relate to high resolution shape synthesis for deep learning systems and applications. Systems and methods are disclosed that use a deep 3D conditional generative model to generate high resolution 3D shapes from lower resolution 3D guides—e.g., coarse voxels, sparse point clouds, scans, etc. A differentiable shape representation may be generated that marries both implicit and explicit 3D representations and, in contrast to prior approaches that optimize for predicting SDF or occupancy values, optimizes for a reconstructed surface of a 3D shape to produce higher quality shapes with finer geometric details. For example, compared to methods that generate explicit representations such as meshes, the systems and methods of the present disclosure produces shapes with arbitrary topology. Specifically, an underlying 2-manifold parameterized by an implicit function encoded with a deformable tetrahedral grid may be predicted, and the underlying 2-manifold may be converted into an explicit mesh, by using a Marching Tetrahedra (MT) algorithm, for example and without limitation. The MT algorithms may be differentiable and more performant than prior MC approaches. The system may maintain efficiency by learning to adapt to grid resolution by deforming and selectively subdividing tetrahedrons—e.g., by focusing computation only on relevant regions in space. In contrast with octree-based shape synthesis, the network of the present disclosure learns grid deformation and subdivision jointly to better represent the surface, without relying on explicit supervision from a pre-computed hierarchy. The deep 3D convolutional generative model may be end-to-end differentiable, allowing the network to jointly optimize the geometry and topology of the surface, as well as the hierarchy of subdivisions using a loss function defined explicitly on the surface mesh. In addition, prior approaches claim that a singularity in the MC formulation prevents typological changes during training, which is disproven by the present systems and methods. For example, the 3D representation of the present systems and methods scales to high resolution and does not require additional modification to the backward pass. Further, the deep 3D convolutional generative model has the capability of representing arbitrary topology, and directly optimizes for the surface reconstruction to alleviate these issues.

BRIEF DESCRIPTION OF THE DRAWINGS

The present systems and methods for high resolution shape synthesis for deep learning systems and applications are described in detail below with reference to the attached drawing figures, wherein.

DETAILED DESCRIPTION

Systems and methods are disclosed related to high resolution shape synthesis for deep learning systems and applications. The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems. Although described herein primarily with respect to 3D shape or content creation, synthesis, or reconstruction, this is not intended to be limiting, and the systems and methods of the present disclosure may be used for two-dimensional (2D) shape or content creation, synthesis, or reconstruction, without departing from the scope of the present disclosure.

Figure 1:
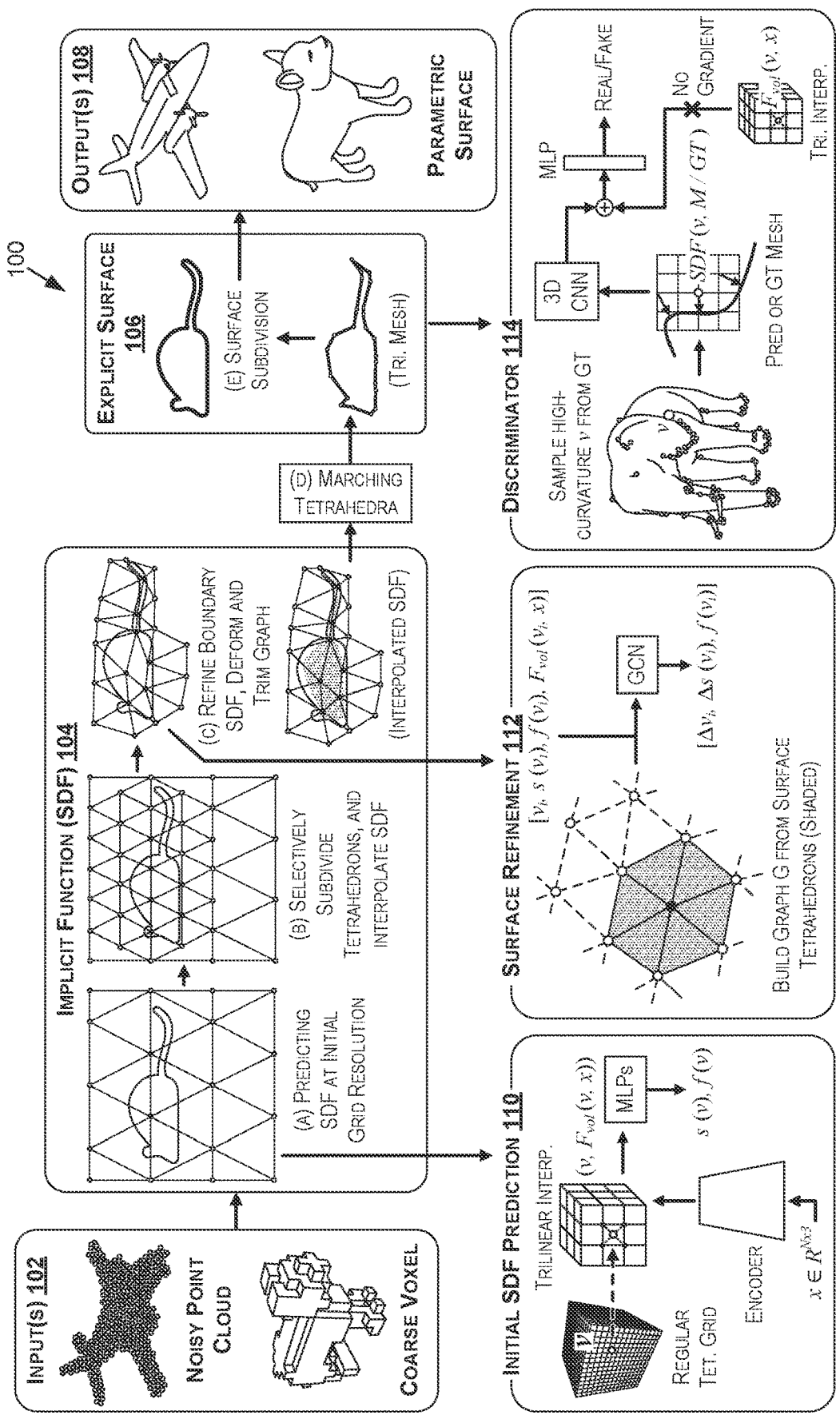
FIG. 1 is a data flow diagram illustrating a process of three-dimensional (3D) shape synthesis and reconstruction, in accordance with some embodiments of the present disclosure.

With reference to FIG. 1, FIG. 1 is a data flow diagram illustrating a process 100 for 3D shape synthesis and reconstruction, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, one or more of the components, features, and/or functionality may be similar to those of example computing device 600 of FIG. 6 and/or example data center 700 of FIG. 7.

The process 100 may be used to synthesize or reconstruct high quality 3D shapes and objects. To generate the 3D shapes, input data representative of one or more inputs 102 may be received and/or generated. The input(s) 102 may include a point cloud (e.g., a sparse point cloud, in embodiments), a voxelized shape (e.g., a coarse voxelized shape), a scan (e.g., a 3D scan), and/or another type of—e.g., lower quality—input 102. This input may be processed using one or more machine learning models such as, without limitation, a deep 3D conditional generative model for high resolution shape synthesis, as represented by (A)-(E) in FIG. 1. For example, the input(s) 102 may be processed using the model to: (A) predict a signed distance field (SDF) at an initial grid resolution; (B) selectively subdivide tetrahedrons of the grid and interpolate an updated SDF of the subdivided grid; (C) refine boundary SDFs and deform and trim graphs; (D) execute a marching tetrahedra approach on the interpolated SDF to generate a triangular mesh; and (E) convert the triangular mesh into a parameterized surface using differentiable surface subdivision. For example, operations (A)-(C) may be executed to generate an implicit function 104, and operation (D) may be executed to generate an explicit surface 106, and (E) surface subdivision may be executed to generate one or more outputs 108 (e.g., high quality 3D shapes or objects).

The model of the process 100 may use a hybrid 3D representation designed for high resolution reconstruction and synthesis. The 3D representation may be represented using an SDF encoded with a deformable tetrahedral grid. The grid may fully tetrahedralize a unit cube, where each cell in the volume may be a tetrahedron with, e.g., four vertices and faces. A benefit of this representation is that the grid vertices can deform to represent the geometry of the shape more efficiently. In addition, instead of encoding occupancy defined on each tetrahedron as in prior approaches, the signed distance values may be defined on the vertices of the grid to represent the underlying surface implicitly, in embodiments. The use of signed distance values, instead of occupancy, may provide for more flexibility when representing the underlying surface. The deformable tetrahedral mesh may be used as an approximation of an implicit function. To generate the deformable tetrahedral grid, $(V_T, T)$, where $V_T$ are the vertices in the tetrahedral grid T, each tetrahedron $T_k \in T$ may be represented with four vertices, $\{v_{a_k}, v_{b_k}, v_{c_k}, v_{d_k}\}$, with $k \in \{1, \ldots, K\}$, where K is the total number of tetrahedra and $v_{t_k} \in V_T$. The SDF may be represented by interpolating the SDF values defined on the vertices of the grid. For example, the SDF values may be denoted in vertex $v_i \in V_T$ as $s(v_i)$. The SDF values for the points that lie inside the tetrahedron may follow a barycentric interpolation of the SDF values of the four vertices that encapsulates the point.

Figure 2A:
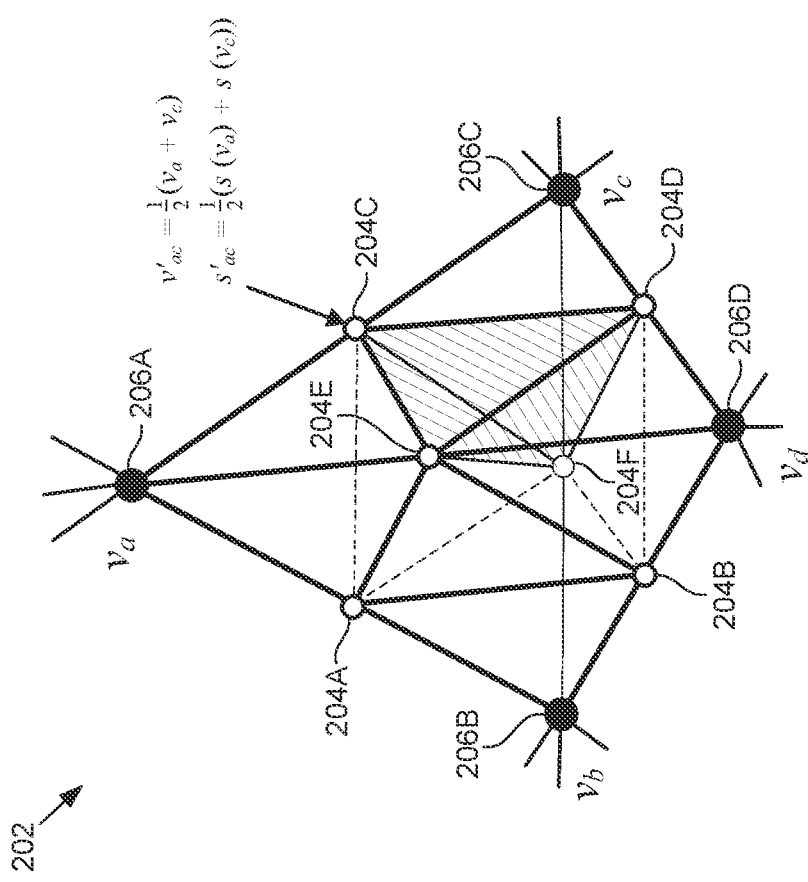
FIG. 2A illustrates an example of volume subdivision of a tetrahedron, in accordance with some embodiments of the present disclosure.

To further increase the flexibility while keeping the memory and computation manageable, the tetrahedra around the predicted surface may be subdivided—e.g., using selective subdivision. In this way, the shape may be represented in a coarse to fine manner to increase efficiency. The surface tetrahedra, $T_{surf}$, may be determined by checking whether a tetrahedron has vertices with different SDF signs (e.g., one positive, one negative)—indicating that the tetrahedron intersects the surface encoded by the SDF. These surface tetrahedra, $T_{surf}$, may be subdivided, in addition to, in embodiments, the immediate neighbors of the surface tetrahedra. The resolution may be increased by adding a mid-point to each edge, as illustrated in FIG. 2A, where each surface tetrahedron, $T_{surf}$ 202, is divided into eight tetrahedron by adding mid-points 204 (e.g., 204A, 204B, 204C, 204D, 204E, and 204F) between each original vertex 206 (e.g., 206A (or $v_a$), 206B (or $v_b$), 206C (or $v_c$), and 206D (or $v_d$)). SDF values may then be computed for the new vertices by, e.g., averaging the SDF values on the edge (e.g., if the SDF values of the original vertices were −2 and +4, the mid-point or new vertex SDF value may be +1).

Figure 2B:
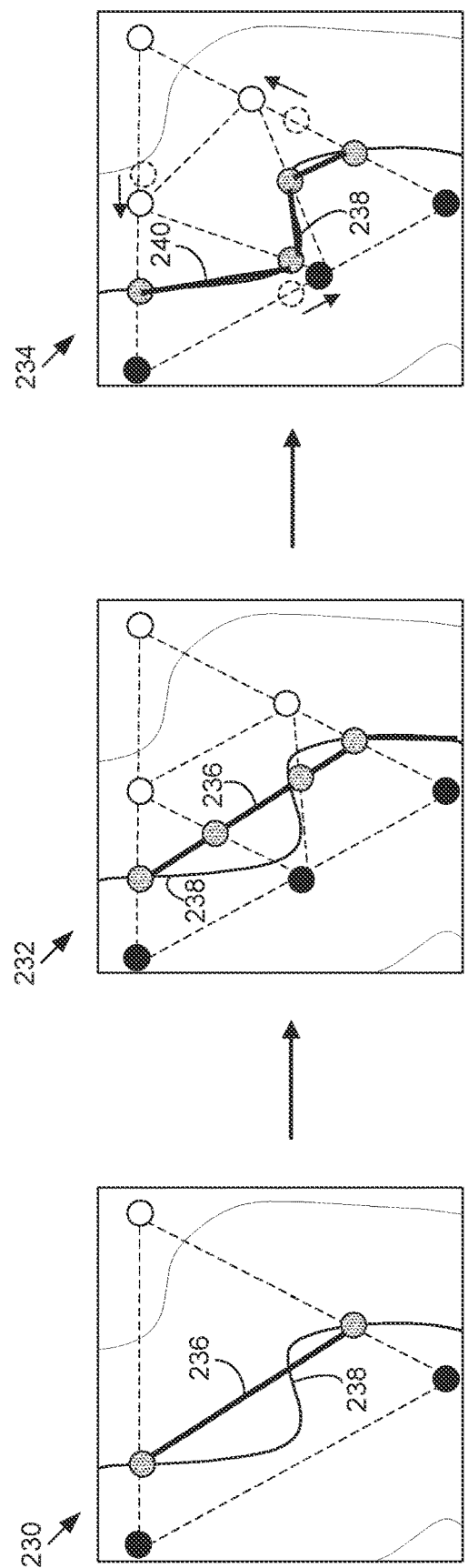
FIG. 2B illustrates example visualizations of surface estimations with and without volume subdivision, in accordance with some embodiments of the present disclosure.

FIG. 2B illustrates the results of volume subdivision along the surface tetrahedra as opposed to not using volume subdivision. For example, visualization 230 includes a portion 236 of an estimated surface alongside a ground truth surface 238, where the portion 236 of the estimated surface does not capture the contours of the ground truth surface 238. Visualization 232, however, includes the portion 236 of the estimated surface after volume subdivision and prior to local updates to vertex positions and SDFs, while visualization 234 includes an updated portion 240 of the estimated surface after volume subdivision and after updating the vertex positions and the SDFs. The updated portion 240 of the estimated surface more closely follows the contours of the ground truth surface 238, thus resulting in a more accurate implicit representation of the object.

Figure 3:
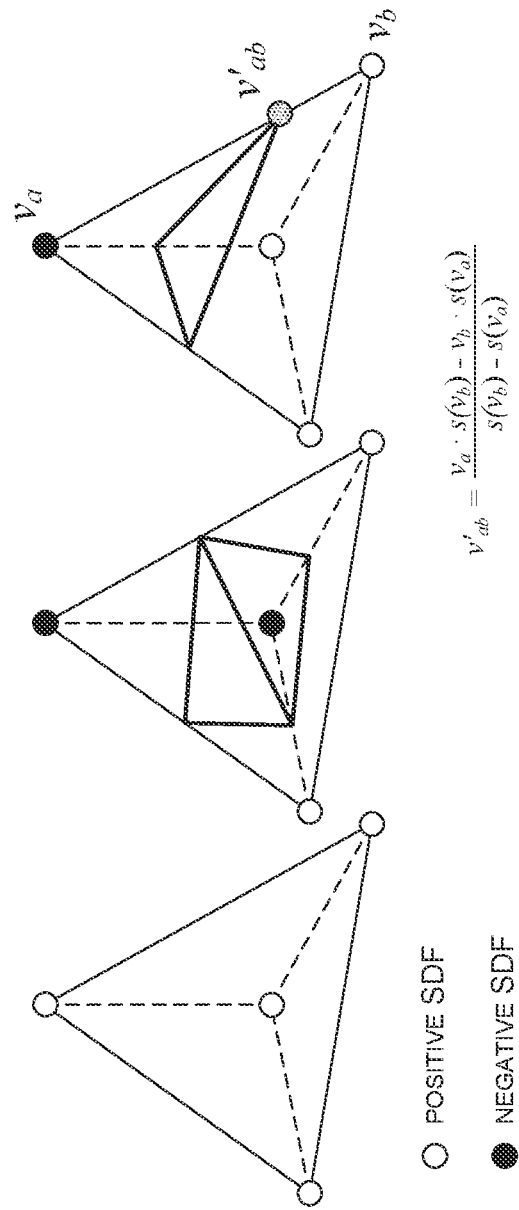
FIG. 3 illustrates an example of identifying a vertex location of an iso-surface, in accordance with some embodiments of the present disclosure.

The signed distance based implicit representation—e.g., after subdivision—may be converted into a triangular mesh using a marching tetrahedra layer, and this mesh may be converted into a parameterized surface with a differentiable surface subdivision module. For example, a marching tetrahedra (MT) algorithm may be used to convert the encoded SDF into an explicit triangular mesh. Given the SDF values, $\{s(v_a), s(v_b), s(v_c), s(v_d)\}$, of the vertices of the tetrahedron, the MT algorithm may be used to determine the surface typology inside the tetrahedron based on the signs of s(v), as illustrated in FIG. 3. In such an example, the total number of configurations may be $2^4$, or 16, which falls into three unique cases after considering rotation symmetry. Once the surface typology inside the tetrahedron is identified, the vertex location of the iso-surface may be computed at the zero crossings of the linear interpolation along the tetrahedron's edges, as illustrated in FIG. 3. In one or more embodiments, the equation may only be evaluated when signs $s(v_a) \neq$ signs $s(v_b)$; as such the singularity in the formulation (e.g., when $s(v_a)=s(v_b)$) can be avoided, and the gradient from a loss defined on the extracted iso-surface can be back-propagated to both vertex positions and SDF values, e.g., via the chainurn rule.

Differentiable surface subdivision may be executed on the triangular mesh to increase the representation power and the visual quality of the shapes. A loop subdivision method may be executed that, instead of using a fixed set of parameters for subdivision, uses learnable parameters. Specifically, the learnable parameters may include the positions of each mesh vertex $v_i'$, as well as $a_i$, which controls the generated surface via weighting the smoothness of neighboring vertices. In contrast with prior approaches, and to conserve computational resources, the per-vertex parameters may only be predicted at the beginning and carried through to subsequent subdivision iterations. The result may be an explicit surface 106 that may be used to generate the output(s) 108—e.g., shapes or objects represented using parametric surfaces.

The deep neural network(s) (DNN(s)) that may be used to generate the outputs 108 may include, in non-limiting embodiments, a 3D deep conditional generative model. For example, the DNN may use the hybrid 3D representation described herein to learn to output a high resolution 3D mesh, M, from an input, x, which may include a point cloud, a coarse voxelized shape, a scan, and/or the like. For example, the DNN may include one or more modules, which may each be tasked with computing an intermediate output or a final output during the processing of the input, x, to generate the 3D mesh, M.

In some embodiments, as illustrated in FIG. 1, the model may include one or more machine learning models tasked with an initial SDF prediction 110. As such, the model may include an input encoder that extracts a 3D feature volume, $F_{vol}(x)$, from a point cloud. When the input 102 is not a point cloud, and is a coarse voxelized shape, for example, points may be sampled from the surface of the voxelized shape to generate a point cloud. The machine learning model(s) may then be used to generate a feature vector $F_{vol}(v, x)$ for a grid vertex $v \in \mathbb{R}^3$ via trilinear interpolation. The initial prediction of the SDF value for each vertex in the initial deformable tetrahedral grid may be generated using, e.g., a fully connected network $s(v)=$MLP $(F_{vol}(v, x), v)$. The fully connected network may additionally output a feature vector f(v), which may be used for surface refinement in the volume subdivision stage.

Surface refinement 112 may be performed after obtaining the initial SDF to iteratively refine the surface and subdivide the tetrahedral grid. For example, the surface tetrahedra $T_{surf}$ may be identified based on the current s(v) value, and a graph, $G=(V_{surf}, E_{surf})$ may be generated, where $V_{surf}$ and $E_{surf}$ correspond to the vertices and edges in $T_{surf}$. The position offsets, $\Delta v_i$ and SDF residual values $\Delta s(v_i)$ may be predicted for each vertex I in $V_{surf}$ using, e.g., a graph convolutional network, such as represented in equations (1) and (2), below:

$$f_{v_i}'=\text{concat}(v_i, s(v_i), F_{vol}(v_i, x), f(v_i)) \quad (1)$$

$$\Delta v_i, \Delta s(v_i), \overline{f(v_i)})_{i=1,\ldots N_{surf}}=\text{GCN}((f_{v_i}')_{i=1,\ldots N_{surf}} G) \quad (2)$$

where $N_{surf}$ is the total number of vertices in $V_{surf}$ and $f(v_i)$) is the updated per-vertex feature. The vertex position and the SDF value for each vertex $v_i$ may be updated as $v_i'=v_i+\Delta v_i$ and $s(v_i')=s(v_i)+\Delta s(v_i)$. This refinement operation may flip the sign of the SDF values to refine the local typology and to move the vertices, which results in improved local geometry.

Figures 4A, 4B:
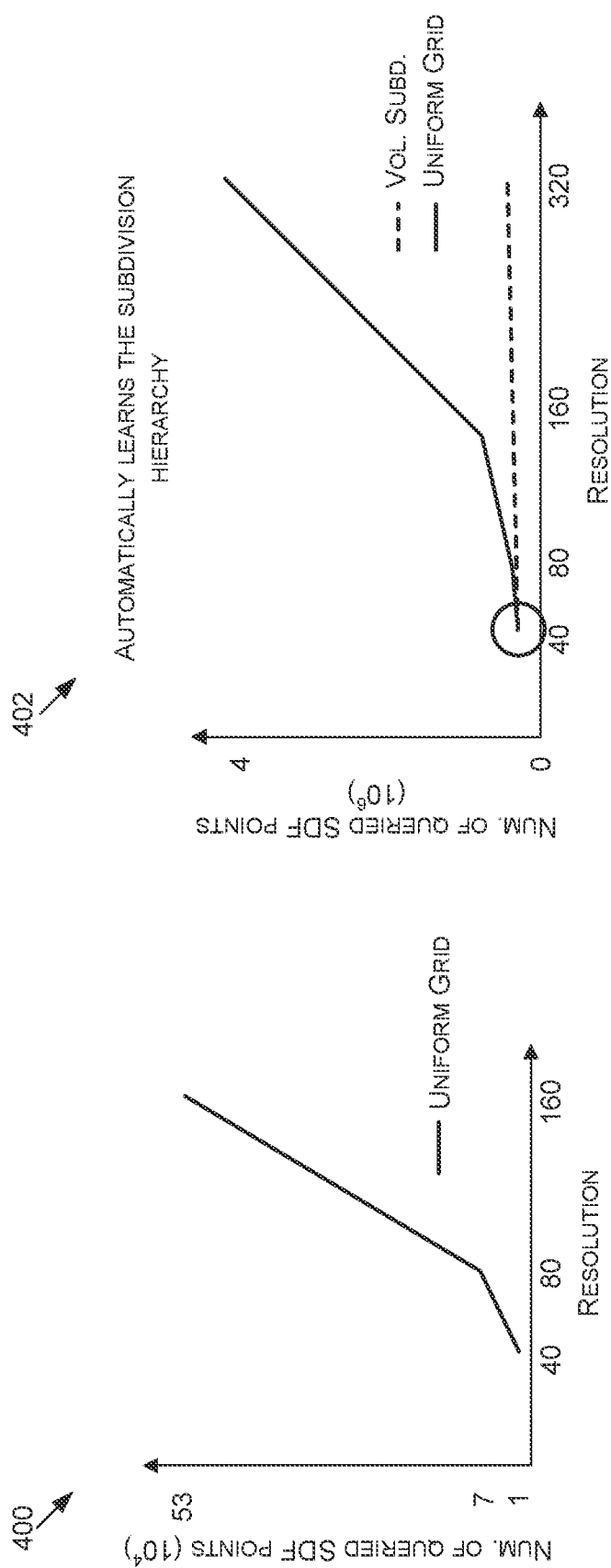
FIGS. 4A-4B illustrate graphs indicative of compute and memory resource requirements with and without selective volume subdivision, in accordance with some embodiments of the present disclosure.

After the surface refinement, a volume subdivision operation may be performed, and may be followed by an additional surface refinement operation. For example, $T_{surf}$ may be re-identified and $T_{surf}$ and the immediate neighbors may be subdivided. The unsubdivided tetrahedra may be dropped or excluded from the full tetrahedral grid during both operations, in embodiments, which saves memory and computation, as the size of the $T_{surf}$ is proportional to the surface area of the object, and scales up quadratically rather than cubically as the grid resolution increases. For example, as illustrated in FIGS. 4A and 4B, graph 400 illustrates volume subdivision and surface refinement computation without excluding the unsubdivided tetrahedra, and graph 402 illustrates volume subdivision and surface refinement computation when excluding the unsubdivided tetrahedra.

In addition, because the SDF values and positions are inherited from the level before subdivision, the loss computed at the final surface can back-propagate to all vertices from all levels. As a result, the model may automatically learn to subdivide the tetrahedra without an additional loss term in the intermediate steps to supervise the learning of the octree hierarchy, as was required in prior approaches.

After extracting the surface mesh using the marching tetrahedra algorithm (e.g., operation (D) in FIG. 1), learnable surface subdivision may be applied at (E). Because the output is a triangular mesh, the learnable surface subdivision may convert the output to a parametric surface with infinite resolution, which allows for end-to-end trainability of the model. In practice, a new graph may be generated on the extracted mesh, and a graph convolutional network may be used to predict the updated position of each vertex $v_i'$, and $\alpha_i$ for loop subdivision. This operation may remove quantization errors and may mitigate the approximation errors from the classic loop subdivision by adjusting $\alpha_i$, which are fixed in the classic method.

In some embodiments, given the differentiable surface representation from the model, a 3D discriminator may be applied on the final surface predicted using the 3D generator (e.g., after the implicit function 104, the marching tetrahedra algorithm, and/or the surface subdivision to generate the explicit surface 106). The 3D discriminator may be used on local patches sampled from high curvature areas and the predicted mesh, and the loss—e.g., the adversarial loss, described herein—may push the prediction to reconstruct high fidelity geometric details. For example, the 3D discriminator may include a 3D convolutional neural network (CNN), and may be used on the SDF that is computed from the predicted mesh to capture local details. A high curvature vertex, v, may be randomly selected from the target mesh and a ground truth SDF, $S_{real} \in \mathbb{R}^{N \times N \times N}$, may be computed at a voxelized region around v. Similarly, the SDF of the predicted surface mesh, M, may be computed at the same location to obtain $S_{pred} \in \mathbb{R}^{N \times N \times N}$. $S_{pred}$ may correspond to an analytical function of the mesh, M, and thus the gradient to $S_{pred}$ may be back-propagated to the vertex position M. $S_{real}$ and $s_{pred}$ may be fed into the discriminator 114, along with the feature vector $F_{vol}(v, x)$ in position v. The discriminator 114 may then predict the probability indicating whether the input comes from the real or generated shapes.

The model—e.g., the 3D deep conditional generative model—of the present disclosure may be end-to-end trainable. In one or more embodiments, one or more modules may be supervised to minimize the error defined on the final predicted mesh, M. One or more loss functions may be used that each include one or more different loss terms. For example, in non-limiting embodiments, a loss function may be used that includes three different terms: a surface alignment loss to encourage alignment with the ground truth surface; an adversarial loss to improve realism of the generated shape; and regularizations to regularize the behavior of the SDF and vertex deformations.

The surface alignment loss may include sampling a set of points, $P_{gt}$ from the surface of the ground truth mesh, $M_{gt}$. A set of points from $M_{pred}$ may also be sampled to obtain $P_{pred}$, and the L2 chamfer distance and normal consistency loss may be minimized between $P_{gt}$ and $P_{pred}$. For example, the surface alignment loss may be computed using equation (3), below:

$$L_{cd} = \sum_{p \in P_{pred}} q \in P_{gt}^{min} \|p - q\|_2 + \sum_{p \in P_{gt}} p \in P_{pred}^{min} \|q - p\|_2,$$

$$L_{normal} = \sum_{p \in P_{pred}} (1 - |\vec{n_p} \cdot \vec{n_{\hat{q}}}|)$$

where $\hat{q}$ is the point that corresponds to p when computing the chamfer distance, and $\vec{n_p}$ and $\vec{n_{\hat{q}}}$ denote the normal direction at points p, $\hat{q}$, respectively.

The adversarial loss may be computed according to equation (4), below:

$$L_D = \frac{1}{2}[(D(M_{gt})-1)^2 + D(M_{pred})^2],$$
$$L_G = \frac{1}{2}[(D(M_{pred})-1)^2] \qquad (4)$$

With respect to regularizations, the loss functions of equations (3) and (4) operate on the extracted surface, and, as a result, only the vertices that are close to the iso-surface in the tetrahedral grid may receive gradients, while the other vertices may not. The surface losses also may not provide information about what is inside and/or outside, since flipping the SDF sign of all vertices in a tetrahedron would result in the same surface being extracted by the marching tetrahedron algorithm. This may lead to disconnected components during training, so an SDF loss may be added to regularize the SDF values. In some embodiments, the SDF regularization loss may be computed according to equation (5), below:

$$L = \lambda_{cd} L_{cd} + \lambda_{normal} L_{normal} + \lambda_G L_G + \lambda_{SDF} L_{SDF} + \lambda_{def} L_{def} \qquad (5)$$

where $\lambda_{cd}$, $\lambda_{normal}$, $\lambda_G$, $\lambda_{SDF}$, and $\lambda_{def}$ are hyperparameters.

Figure 5:
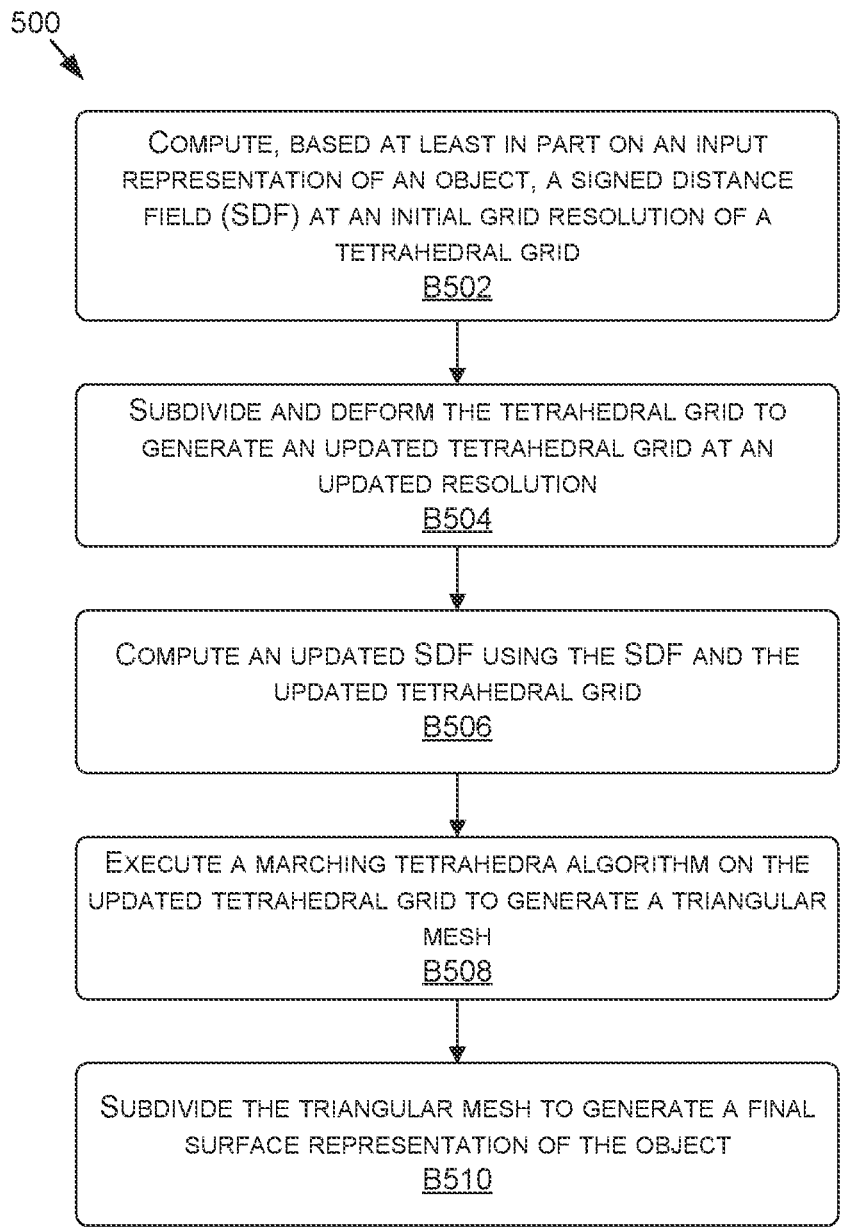
FIG. 5 is a flow diagram showing a method for high resolution shape synthesis, in accordance with some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The method 500 may also be embodied as computer-usable instructions stored on computer storage media. The method 500 may be provided by a standalone application, a service or hosted service (standalone or in combination with another hosted service), or a plug-in to another product, to name a few. In addition, method 500 is described, by way of example, with respect to the process 100 of FIG. 1. However, this method 500 may additionally or alternatively be executed by any one process or system, or any combination of processes and systems, including, but not limited to, those described herein.

FIG. 5 is a flow diagram showing a method 500 for high resolution shape synthesis, in accordance with some embodiments of the present disclosure. The method 500, at block B502, includes computing, based at least in part on an input representation of an object, a signed distance field (SDF) at an initial grid resolution of a tetrahedral grid. For example, using an input 102, an SDF may be computed at an initial grid resolution of a tetrahedral grid.

The method 500, at block B504, includes subdividing and deforming the tetrahedral grid to generate an updated tetrahedral grid at an updated resolution. For example, the tetrahedral grid may be selectively subdivided and deformed.

The method 500, at block B506, includes computing an updated SDF using the SDF and the updated tetrahedral grid.

For example, based on the subdividing and deforming, SDF values of updated vertices of the updated tetrahedral grid may be computed.

In some embodiments, the operations of blocks B504 and/or B506 may be executed multiple times—e.g., until a target resolution is reached.

The method 500, at block B508, includes executing a marching tetrahedra algorithm on the updated tetrahedral grid to generate a triangular mesh. For example, a marching tetrahedra algorithm may be executed on the deformable grid (e.g., after subdivision, deformation, and updating the SDF), to extract an iso-surface (e.g., a triangular mesh).

The method 500, at block B510, includes subdividing the triangular mesh to generate a final surface representation of the object. Surface subdivision may then be applied to the iso-surface to generate a parametric (e.g., explicit) surface as the output 108.

Example Computing Device

Figure 6:
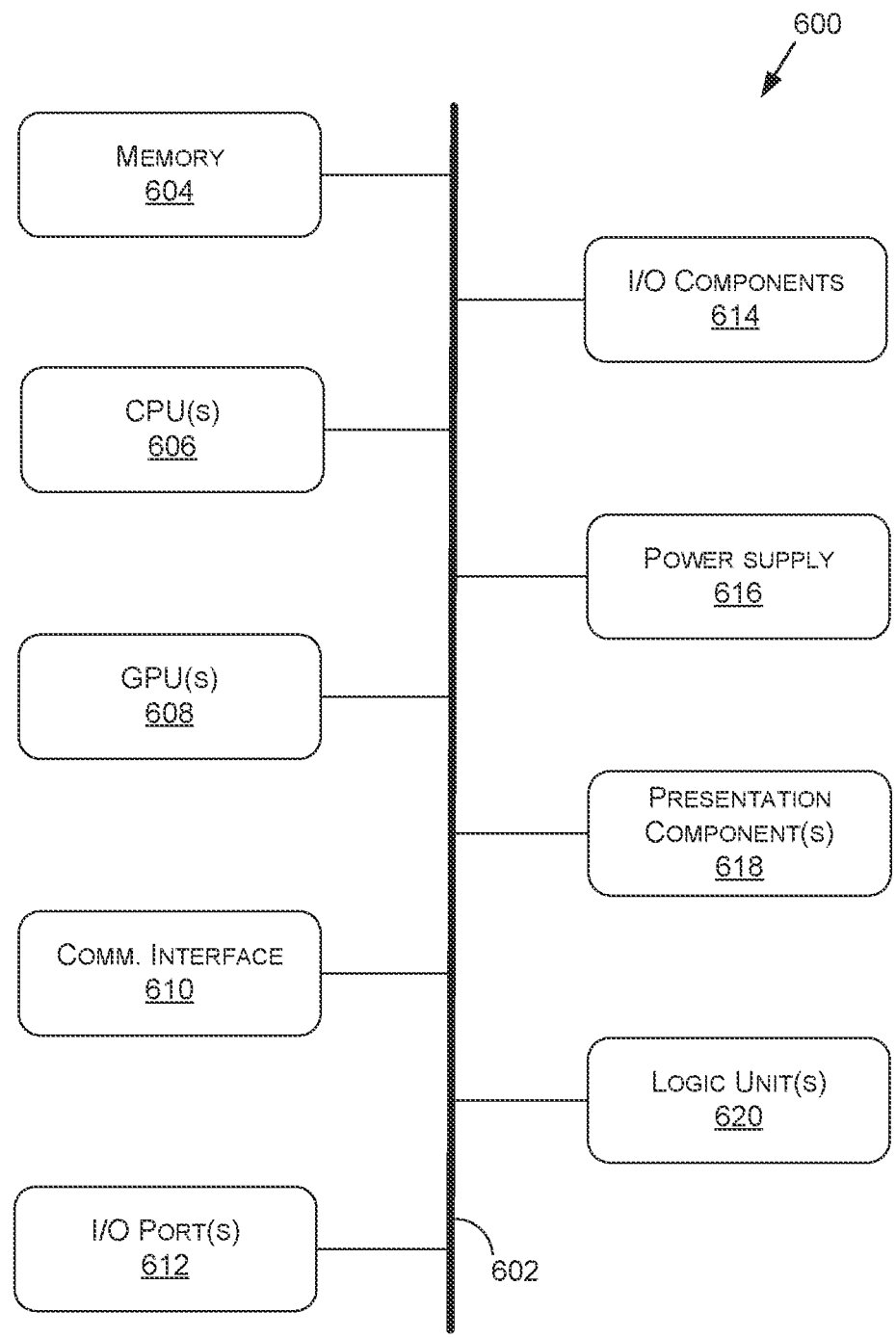
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
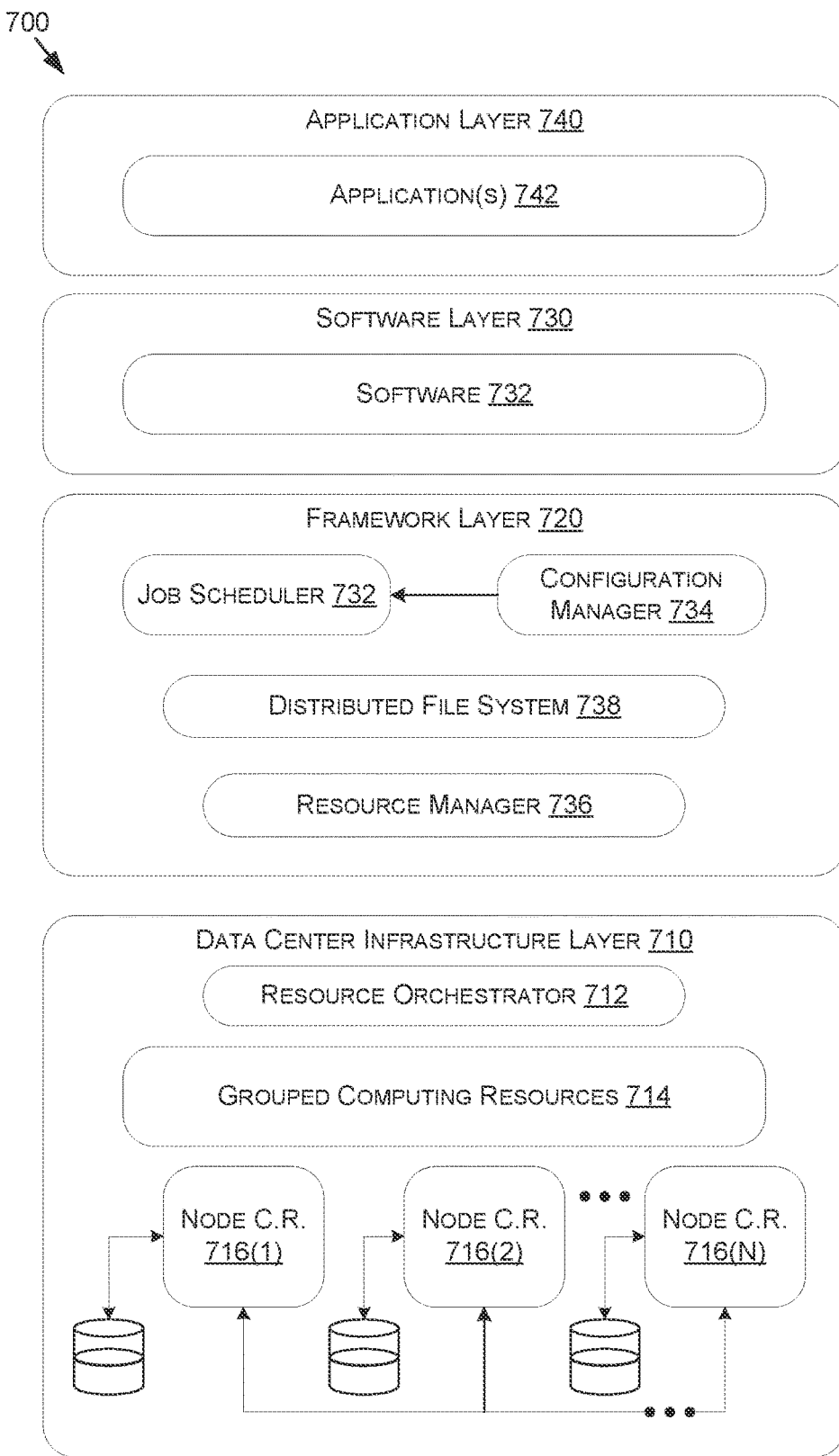
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
one or more circuits to:
compute, based at least on an input representation of an object, a signed distance field (SDF) at an initial grid resolution of a grid;
subdivide and deform the grid to generate an updated grid at an updated resolution;
compute an updated SDF using the SDF and the updated grid;
generate a triangular mesh using the updated SDF; and
subdivide the triangular mesh to generate a parametric surface representation of the object.

2. The processor of claim 1, wherein the subdivision of the triangular mesh is executed using learned surface subdivision.

3. The processor of claim 1, wherein the input representation of the object includes at least one of a voxel representation, a point cloud, or a three-dimensional (3D) scan.

4. The processor of claim 1, wherein the updated SDF is interpolated from the SDF using one or more updated vertex positions of the updated grid.

5. The processor of claim 1, wherein the computation of the SDF is executed by, at least in part:
computing, using a convolutional neural network, one or more first feature vectors; and
computing, using a neural network and based at least on the one or more first feature vectors, one or more SDF values for one or more vertices of the grid and one or more second feature vectors.

6. The processor of claim 1, wherein the subdivision and the deformation of the grid is executed by, at least in part:
identifying one or more surface volumes of the grid that correspond to a surface of the object;
generate a graph corresponding to one or more vertices and one or more edges of the one or more surface volumes; and
computing, using a graph convolutional network and based at least on the graph, one or more position offsets and one or more residual SDF values for the one or more vertices.

7. The processor of claim 1, wherein the subdivision of the grid includes selective subdivision, wherein the selective subdivision includes subdividing at least one of:
one or more first surface volumes of the grid that intersect a surface of the object; or
one or more second surface volumes that are immediately adjacent the one or more first surface volumes.

8. The process of claim 1, wherein, the one or more circuits are to generate the parametic surface representation using a generative adversarial network (GAN).

9. The processor of claim 1, wherein the processor is comprised in at least one of:
a control system for an autonomous or semi-autonomous machine;
a perception system for an autonomous or semi-autonomous machine;
a system for performing simulation operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

10. A system comprising:
one or more processing units comprising processing circuitry to:
compute, based at least on an input representation of an object, a signed distance field (SDF) corresponding to an initial grid;
subdivide and deform the initial grid to generate an updated grid;
compute an updated SDF using the SDF and the updated grid;
generate an explicit surface representation using the updated SDF; and
subdivide the explicit surface representation to generate a parametric surface representation of the object.

11. The system of claim 10, wherein the subdivision of the explicit surface representation is executed using learned surface subdivision.

12. The system of claim 10, wherein the input representation of the object includes at least one of a voxel representation, a point cloud, or a three-dimensional (3D) scan.

13. The system of claim 10, wherein the updated SDF is interpolated from the SDF using one or more updated vertex positions of the updated grid.

14. The system of claim 10, wherein the computation of the SDF is executed by, at least in part:
computing, using a convolutional neural network, one or more first feature vectors; and
computing, using a neural network and based at least in part on the one or more first feature vectors, one or more SDF values for one or more vertices of the grid and one or more second feature vectors.

15. The system of claim 10, wherein the subdivision and the deformation of the initial grid is executed by, at least in part:
identifying one or more surface volumes of the initial grid that correspond to a surface of the object;
generate a graph corresponding to one or more vertices and one or more edges of the one or more surface volumes; and
computing, using a graph convolutional network and based at least on the graph, one or more position offsets and one or more residual SDF values for the one or more vertices.

16. The system of claim 10, wherein the subdivision of the grid includes selective subdivision, wherein the selective subdivision includes subdividing at least one of:
one or more first surface volumes of the grid that intersect a surface of the object; or
one or more second surface volumes that are immediately adjacent the one or more first surface volumes.

17. The system of claim 10, wherein the one or more circuits generate the parametic surface representation using a generative adversarial network (GAN).

18. The system of claim 10, wherein the system is comprised in at least one of:
a control system for an autonomous or semi-autonomous machine;
a perception system for an autonomous or semi-autonomous machine;
a system for performing simulation operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

19. A processor comprising:
processing circuitry to:
compute, based at least on an input representation of a shape, a signed distance field (SDF) corresponding to an initial grid;

subdivide the initial grid to generate an updated grid;
compute an updated SDF using the SDF and the updated grid;
generate a mesh using the updated SDF; and
subdivide the mesh to generate a parametric surface representation of the shape.

20. The processor of claim 19, wherein the processor is comprised in at least one of:
a control system for an autonomous or semi-autonomous machine;
a perception system for an autonomous or semi-autonomous machine;
a system for performing simulation operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

21. The processor of claim 19, wherein the computation of the SDF is executed by, at least in part:
computing, using a convolutional neural network, one or more first feature vectors; and
computing, using a neural network and based at least on the one or more first feature vectors, one or more SDF values for one or more vertices of the grid and one or more second feature vectors.

* * * * *